United States Patent [19]

Nagaishi et al.

[11] 4,152,935
[45] May 8, 1979

[54] MASS FLOW MEASURING APPARATUS

[75] Inventors: Hatsuo Nagaishi, Yokosuka; Hiroyuki Maruoka, Yokohama, both of Japan

[73] Assignee: Nissan Motor Company, Limited, Yokohama, Japan

[21] Appl. No.: 868,916

[22] Filed: Jan. 12, 1978

[51] Int. Cl.² .................... G01F 1/56; G01F 1/70
[52] U.S. Cl. ................................................ 73/194 F
[58] Field of Search .................. 73/194 F; 324/32; 250/324, 356

[56] References Cited

U.S. PATENT DOCUMENTS

| | | | |
|---|---|---|---|
| 2,569,974 | 10/1951 | Campbell | 73/194 |
| 2,637,206 | 5/1953 | Atkins | 73/194 X |
| 2,637,208 | 5/1953 | Mellen | 73/194 |
| 2,986,923 | 6/1961 | Vonnegut | 73/194 X |
| 3,577,158 | 5/1971 | Hahn | 250/356 |
| 3,996,795 | 12/1976 | Servassier et al. | 73/194 |
| 4,041,376 | 8/1977 | Furuto et al. | 73/194 X |
| 4,053,769 | 10/1977 | Nishikawa et al. | 250/324 X |

Primary Examiner—Herbert Goldstein
Attorney, Agent, or Firm—Schwartz, Jeffery, Schwaab, Mack, Blumenthal & Koch

[57] ABSTRACT

An ion collecting electrode is located downstream of ionizing means, the ions migrating at the same speed as the mass flow and being collected by the collecting electrode. The transit time of the ions over the distance between a predetermined point of the path of fluid and the collecting electrode is measured. A grounded shielding electrode protects the ion collecting electrode from being attacked by the electro-magnetic wave inevitably generated by the ionizing means upon operation of the same.

6 Claims, 9 Drawing Figures

MASS FLOW MEASURING APPARATUS

FIELD OF THE INVENTION

The present invention relates in general to mass flow measuring apparatus which measures the drift of ionized fluid mass and more particularly to a mass flow measuring apparatus which can measure the transit time of an ionized fluid mass migrating with the surrounding fluid mass over a predetermined distance between two points in the path of fluid flow.

BACKGROUND OF THE INVENTION

Among internal combustion engines, there is a type of using a feedback control system in which the air-fuel ratio of the air-fuel mixture fed to the engine proper is automatically controlled to a stoichiometric value by computing the informations given by an exhaust gas component sensor disposed in an exhaust conduit of the engine. In designing such a control system, accurate measurement of mass flow rate of air or fuel is very important. For this purpose, many kinds of mass flow measuring devices have been proposed, not one of these known devices, however, is perfect in measuring the mass flow rate with quick responsiveness.

SUMMARY OF THE INVENTION

Therefore, it is an object of the present invention to provide a mass flow measuring apparatus which can measure the mass flow rate of air or fuel accurately.

It is another object of the present invention to provide a mass flow measuring apparatus the responsiveness of which to mass flow variations is greatly improved.

BRIEF DESCRIPTION OF THE DRAWINGS

Other advantages and features of the prevent invention will be understood from the following description when taken in conjunction with the accompanying drawings, in which.

DESCRIPTION OF THE PREFERRED EMBODIMENTS

Figure 1:
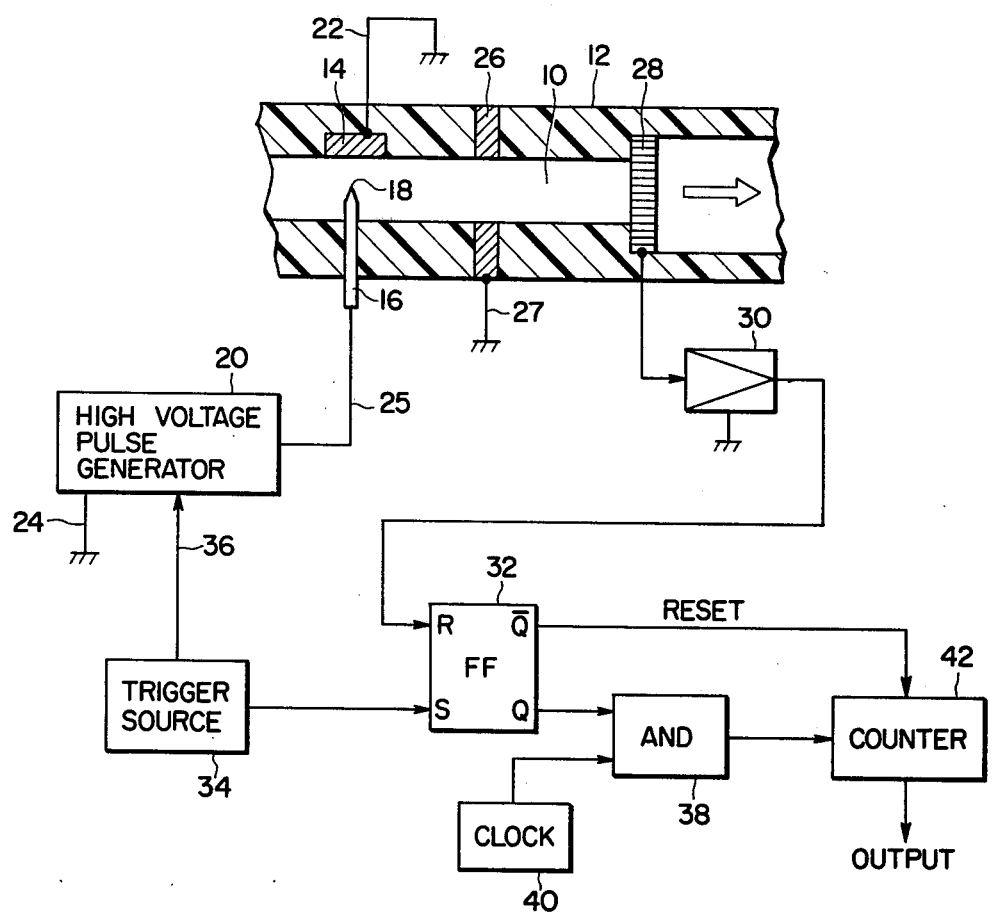
FIG. 1 shows a first embodiment of the present invention.

A first embodiment of a mass flow measuring apparatus is shown in FIG. 1 in which fluid is directed, as indicated by an arrow, to pass through a passage 10 of a hollow cylindrical structure or pipe 12 which is constructed of an electrically non-conductive material. Ionizing means are provided which are formed by two electrodes: a first electrode 14 and a second electrode 16 having a reduced diameter or pointed section 18. The first electrode 14 is embedded into the inner wall surface of the pipe 12 and connected electrically to a high voltage pulse generator 20 through grounded conductors 22 and 24. The second electrode 16 is disposed in the pipe 12 with the pointed section 18 thereof directed toward but spaced apart from the first electrode 14, as shown. A conductor 25 electrically connects the second electrode 16 with a terminal or output of the pulse generator 20. An electromagnetic wave shielding electrode 26 is embedded in the pipe 12 at a position downstream of the ionizing electrodes 14 and 16 and is grounded via conductor 27. Preferably, the shielding electrode 26 is formed into a disc form having a center opening through which the fluid is passed. An ion collecting electrode 28 is mounted in the pipe 12 downstream of the shielding electrode 26 and connected electrically to a sense amplifier 30 the output of which is connected to the reset terminal of a flip-flop 32. This flip-flop 32 is triggered into a set condition by a signal from a trigger source 34 which also supplies the trigger signal to the pulse generator 20 via a conductor 36. The trigger source 34 generates the trigger pulse at regular intervals to provide successive measurements of the prevailing value of flow rate.

An AND gate 38 is connected to the Q output of the flip-flop 32 to pass clock pulses from a clock source 40 to a binary counter 42 which is reset by the $\overline{Q}$ output of the flip-flop 32. The counter 42 provides a digital output representing the transit time of the flow in the passage 10 over the distance between the pointed portion 18 of the second electrode 16 and the collecting electrode 28. This digital output is applied to a flow rate indicating circuit (not shown) where the input signal is used to arithmetically divide the known distance between the electrodes 18 and 28 to compute an instantaneous value of the flow rate.

The amplitude of the pulse from the pulse generator 20 and the shape and size of the second electrode 16 are determined to establish a corona discharge in the fluid passage 10 so that a portion of the mass is ionized to produce a cloud of oppositely charged ions. The pulse from the generator 20 is of negative polarity because it is found to be advantageous for effecting ionization of a fluid such as gasoline or the like, as compared with the use of positive polarity pulses. As a result, the positively charged ions are rapidly attracted by the negatively biased second electrode 16, while the negatively charged ions migrate in the form of a space charge or cloud of ions with the mass flow down the passage 10 at the same speed until they are collected by the collecting electrode 28, which is sensed by the amplifier 30. Upon the detection of the negatively charged ions by the collecting electrode 28, the flip-flop 32 is switched to a first binary state in response to the trigger pulse and the AND gate 38 is thus enabled to pass clock pulses to the binary counter 42. Upon the detection of the negatively charged ions by the collecting electrode 28, the flip-flop 32 is switched to a second binary state to reset the counter 42.

It is understood therefore that in response to each of the trigger pulses from the trigger source 34, a cloud of negatively charged ions is produced in the passage 10 and migrates at the same speed as the fluid in the passage 10 from the point defined by the second electrode 16 to the point defined by the collecting electrode 28. During the migration of the cloud of ions, the counter 42 is activated to produce an output representative of the transit time of the ions over the known distance between the two defined points. Since the cloud of ions migrates at the same speed as the fluid flow, the digital output from the counter 42 is a measure of the prevailing value of the mass flow rate.

Now, it should be noted that the electro-magnetic wave which is inevitably generated from the ionizing means upon operation thereof is reduced in intensity by the shielding electrode 26 so that the ion collecting electrode 28 is hardly affected by the wave. In fact, the electro-magnetic wave generated attacks strongly the collecting electrode 28 to disturb the same from effectively catching the negatively charged ions especially when the intensity of the wave is high.

Figure 2A:
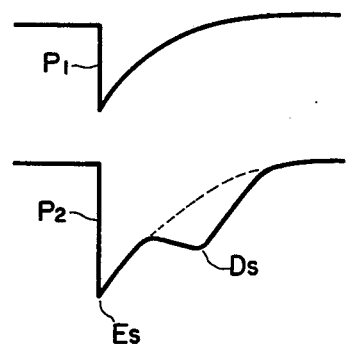
FIGS. 2A and 2B show waveforms explaining the results of a conventional mass flow measuring apparatus and an apparatus of the first embodiment.
Figure 2B:
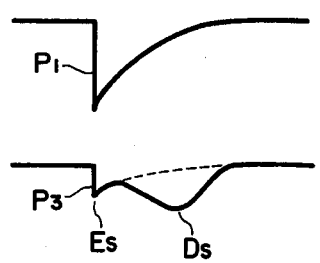

The desirable effects of employing the above-mentioned shielding electrode 26 will be well understood from FIGS. 2A and 2B which respectively show a case without the shielding electrode 26 and another case with the shielding electrode 26. In these figures, the waveform designated by $P_1$ is of a pulse generated by the high voltage pulse generator 20. The waveforms designated by $P_2$ and $P_3$ are of the pulses which are generated by the collecting electrode 28 in response to the operation of the ionizing means. Now, it should be noted that, in the waveforms $P_2$ and $P_3$, the formation of the respective peaks denoted by $E_s$ is caused by the detection of the electro-magnetic wave by the collecting electrode 28 and the formation of the other peaks denoted by $D_s$ is caused by the detection of the negatively charged ions. As will be noted from the waveforms $P_2$ and $P_3$, the peak $E_s$ of the waveform $P_3$ is considerably smaller than that of the waveform $P_2$. This is because of the effect achieved by the shielding electrode 26. This means that in the case with the shielding electrode 28, the necessary peak $D_s$ is readily detected without suffering from the undesirable masking effect by the peak $E_s$.

Figure 3:
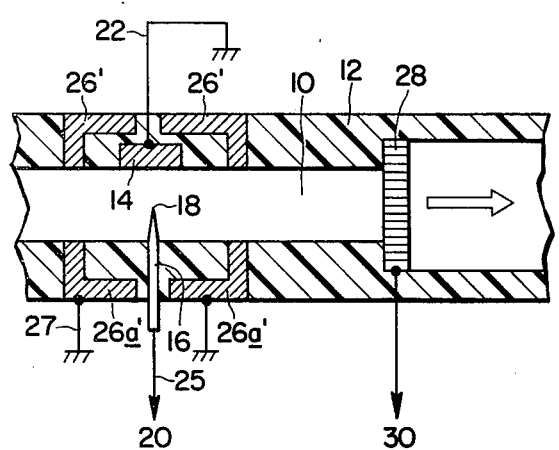
FIG. 3 shows a second embodiment of the present invention.

FIG. 3 shows a second preferred embodiment of the present invention. For facilitation, the wiring circuit parts of the mass flow apparatus are omitted from this drawing since these are substantially same as the case of the first preferred embodiment, and the substantially same parts illustrated are designated by the same numerals as in the case of FIG. 1. As is understood from the drawing, the mass flow measuring apparatus of this second embodiment is very similar to that of the first embodiment except for the construction and location of the electromagnetic wave shielding electrode 26'. The shielding electrode 26' is formed into a cylinder having at its each end of inwardly extending flange portions 26'a formed with a circular center opening (no numeral) through which the fluid passes. The electrode 26' is embedded into the pipe 12 so as to spacedly enclose the ionizing means consisting of the first and second electrodes 14 and 16, while allowing the openings of the flange portions to be aligned with the passage 10 of the pipe 12. Openings (no numerals) are formed in the cylindrical wall of the electrode 26', through which the conductor 22 and the second electrode 16 are respectively passed, as shown.

With the construction of the second embodiment, the shielding to the electro-magnetic wave is more effectively achieved in comparison with that of the first embodiment.

Figure 4:
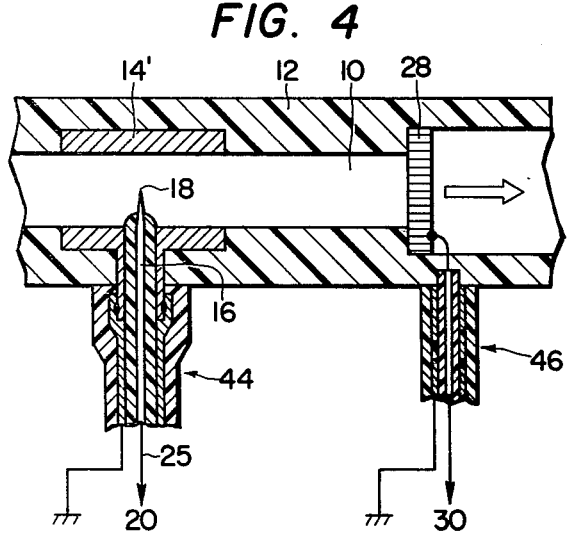
FIG. 4 shows a third embodiment of the present invention.

FIG. 4 shows a third preferred embodiment of the invention. Also in this case, the wiring circuit parts of the mass flow measuring apparatus are omitted from the drawing, and the substantially same parts illustrated are designated by the same numerals as in the case of FIG. 1. In this embodiment, however, the first electrode 14' is formed into a cylinder having increased length so as to serve as the so-called shielding electrode. Furthermore, in this third embodiment, conventional shielding wires 44 and 46 are employed for more effectively shielding the electro-magnetic wave. The first electrode 14' is grounded via the sheath of the wires 44, as shown. Of course, such shielding wires are employable in the cases of the before-mentioned first and second embodiments.

Figure 5A:
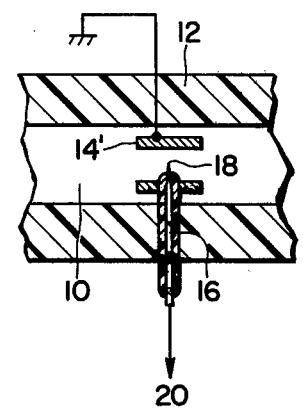
FIGS. 5A and 5B are views showing two modifications of a part of the mass flow measuring apparatus according to the invention.
Figure 5B:
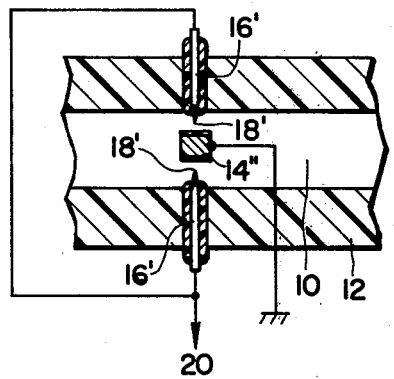

FIGS. 5A and 5B show two modifications of the ionizing means which are employable in the first and second embodiments. These two modifications will assure more reliable and easy ionization of the fluid passing through the passage 10 of the pipe 12. The first electrode 14' of FIG. 5A is formed into a tube the outer diameter of which is smaller than the inner diameter of the pipe 12 so as to have a reduced distance between the pointed portion 18 of the second electrode 16 and the inner wall surface of the cylindrical first electrode 14'. In case of FIG. 5B, at least two second electrodes 16' are embedded through insulators (no numerals) in the pipe 12 in a manner that the respective pointed portions 18' thereof project slightly into the passage 10 while facing each other. A cylindrical first electrode 14" is disposed concentrically in the passage 10 at a position between the pointed portions 18' of the inner electrodes 16', as shown.

Figure 6A:
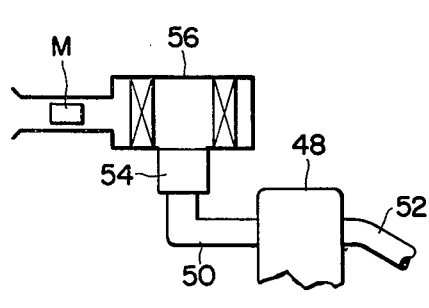
FIGS. 6A and 6B are sketches showing two examples in which the mass flow measuring device of the invention is employed in an internal combustion engine system.
Figure 6B:
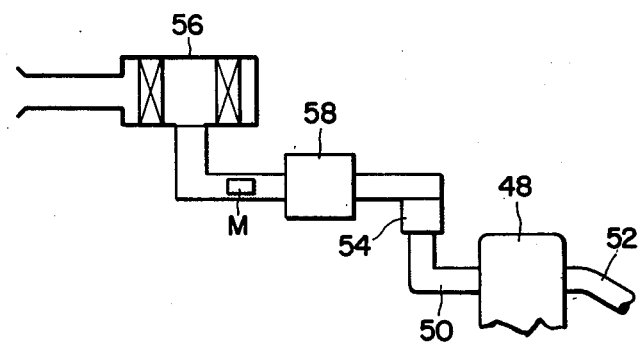

In FIGS. 6A and 6B, there are shown two cases in which the mass flow measuring apparatus of the invention is employed in an internal combustion engine system for measuring the flow rate of the intake air mass. The engine system hereinshown has an engine proper 48, an intake tube 50, an exhaust tube 52, a carburetor 54 and an air filter 56. The system shown in FIG. 6B has furthermore a surge tank 58 at a conduit between the air filter 56 and the carburetor 54. In case of FIG. 6A, the mass flow measuring apparatus M is disposed in the inlet pipe of the filter 56, while in case of FIG. 6B, the apparatus M is in the conduit between the filter 56 and the surge tank 58.

In the above, there has been described that the first electrode 14, 14' or 14" is grounded and the second electrode 16 or 16' is connected to the output of the high voltage pulse generator 20, however, it is also possible to use the opposite way in which the first electrode is connected to the output of the generator and the second electrode is grounded. In this way, the negatively charged ions migrating in the passage 10 are not affected at all by the shielding electrode 26 which is grounded.

The foregoing description shows only preferred embodiments of the present invention. Various modifications are apparent to those skilled in the art without departing from the scope of the subject invention which is only limited by the appended claims. Therefore, the embodiments shown and described are only illustrative, not restrictive.

What is claimed is:

1. An apparatus for measuring the mass flow of fluid passing therethrough, comprising:
   first means for ionizing the fluid to generate an electrically distinguishable fluid mass from the surrounding mass of fluid, said electrically distinguishable fluid mass migrating with the surrounding mass of fluid between a first predetermined point and a second predetermined point along the path of fluid flow, said second predetermined point being located downstream of said first predetermined point, said first means including first and second electrodes disposed in the path of fluid flow and biasing means for momentarily biasing said first and second electrodes at opposite potentials at intervals;

second means for detecting the presence of said electrically distinguishable fluid mass at said second predetermined point, said second means including a third electrode disposed in the path of fluid flow downstream of a unit of said first and second electrodes for collecting ions produced by said first means;

third means for determining a transit time of said electrically distinguishable fluid mass over the distance between said first and second predetermined points; and fourth means for protecting said second means from being attacked by electro-magnetic waves generated by said first means upon operation of the same, said fourth means including an electrically conductive member which is grounded and located between the unit of said first and second electrodes and said third electrode, said electrically conductive member being formed into a cylinder having at its both ends inwardly extending flanges each of which define a center opening through which the fluid is passed via the interior of said cylinder, said cylinder being arranged and constructed to spacedly enclose the unit of said first and second electrodes permitting a part thereof to be located between the unit of said first and second electrodes and said third electrode.

2. An apparatus as claimed in claim 1, in which said cylinder has at its cylindrical wall portion two openings in which a conductor of said first electrode and a part of said second electrode are spacedly disposed, respectively.

3. An apparatus as claimed in claim 1, in which said first electrode is formed into a tube which is disposed in the path of fluid flow to permit the fluid to pass therethrough, and in which said second electrode is projected into the interior of the first tubular electrode while being insulated from the first tubular electrode.

4. An apparatus as claimed in claim 1, further comprising at least one additional second electrode which is electrically connected to the afore-mentioned second electrode, said additional electrode being disposed in the path of fluid flow at a position near said first electrode.

5. An apparatus for measuring the mass flow of fluid passing therethrough, comprising:

first means for ionizing the fluid to generate an electrically distinguishable fluid mass from the surrounding mass of fluid, said electrically distinguishable fluid mass migrating with the surrounding mass of fluid between a first predetermined point and a second predetermined point along the path of fluid flow, said second predetermined point being located downstream of said first predetermined point, said first means including first and second electrodes disposed in the path of fluid flow and biasing means for momentarily biasing said first and second electrodes of opposite potentials at intervals;

second means for detecting the presence of said electrically distinguishable fluid mass at said second predetermined point, said second means including a third electrode disposed in the path of fluid flow downstream of a unit of said first and second electrodes for collecting ions produced by said first means;

third means for determining a transit time of said electrically distinguishable fluid mass over the distance between said first and second predetermined points; and fourth means for protecting said second means from being attacked by electro-magnetic waves generated by said first means upon operation of the same, said fourth means including an electrically conductive member which is grounded and located between the unit of said first and second electrodes and said third electrode, said electrically conductive member being united with said first electrode and being formed into a cylinder which is arranged to spacedly enclose said second electrode and positioned concentrically in the path of fluid flow permitting the fluid to pass therethrough.

6. An apparatus as claimed in claim 5, in which the connection between the cylinder and the ground and between the second electrode and said biasing means are achieved by shield wires.

* * * * *